United States Patent
Fernandez Guajardo et al.

(10) Patent No.: US 11,900,914 B2
(45) Date of Patent: Feb. 13, 2024

(54) USER SELF-PERSONALIZED TEXT-TO-SPEECH VOICE GENERATION

(71) Applicant: Meta Platforms, Inc., Menlo Park, CA (US)

(72) Inventors: Maria Fernandez Guajardo, Sunnyvale, CA (US); Trent Richard Walkiewicz, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 121 days.

(21) Appl. No.: 17/340,740

(22) Filed: Jun. 7, 2021

(65) Prior Publication Data

US 2022/0392428 A1 Dec. 8, 2022

(51) Int. Cl.
| | |
|---|---|
| *G06F 17/00* | (2019.01) |
| *G10L 13/08* | (2013.01) |
| *G06F 3/16* | (2006.01) |
| *G10L 13/047* | (2013.01) |
| *H04L 67/306* | (2022.01) |

(52) U.S. Cl.
CPC .............. *G10L 13/08* (2013.01); *G06F 3/165* (2013.01); *G10L 13/047* (2013.01); *H04L 67/306* (2013.01)

(58) Field of Classification Search
CPC ..... G10L 13/08; G10L 13/033; G10L 13/047; H04L 67/306; G06Q 50/01; G06Q 30/02; G06F 3/165
USPC ........................................... 704/260; 700/94
See application file for complete search history.

(56) References Cited

U.S. PATENT DOCUMENTS

| | | | |
|---|---|---|---|
| 8,805,854 B2* | 8/2014 | Chen | G10H 1/0008 |
| | | | 707/749 |
| 2003/0229494 A1 | 12/2003 | Rutten et al. | |
| 2006/0170945 A1* | 8/2006 | Bill | H04L 51/04 |
| | | | 358/1.13 |
| 2009/0031882 A1* | 2/2009 | Kemp | G10H 1/0008 |
| | | | 84/609 |
| 2010/0318362 A1* | 12/2010 | Kurzweil | G10L 13/00 |
| | | | 704/260 |
| 2014/0019135 A1 | 1/2014 | Talwar et al. | |
| 2016/0104486 A1* | 4/2016 | Penilla | G10L 15/02 |
| | | | 704/232 |
| 2017/0061955 A1 | 3/2017 | Gueta et al. | |
| 2017/0221484 A1* | 8/2017 | Poltorak | G10L 13/00 |

(Continued)

OTHER PUBLICATIONS

Binkowski M., et al., "High Fidelity Speech Synthesis with Adversarial Networks," ICLR, Jan. 1, 2020, pp. 1-17.

(Continued)

*Primary Examiner* — Paul C McCord
(74) *Attorney, Agent, or Firm* — Greenberg Traurig, LLP

(57) ABSTRACT

An online system receives, from a client device of a posting user, a script for a voice-based content item. The online system retrieves a voice synthesis model stored in the user profile of the posting user and generates a synthetic audio stream using the retrieved voice synthesis model and based on the received script. The online system presents the generated synthetic audio stream to the posting user and receives instructions for modifying the synthetic audio stream. The online system generates a second audio stream based on the received instructions and composes the voice-based tent item based on the generated second audio stream.

17 Claims, 3 Drawing Sheets

(56) References Cited

U.S. PATENT DOCUMENTS

| | | |
|---|---|---|
| 2018/0268820 A1 | 9/2018 | Park et al. |
| 2020/0082807 A1 | 3/2020 | Kim et al. |
| 2021/0104220 A1* | 4/2021 | Mennicken ............. G06F 3/165 |
| 2021/0209293 A1* | 7/2021 | Varma ................ G06Q 30/0613 |
| 2022/0130413 A1* | 4/2022 | Kr ........................... G10L 25/63 |
| 2023/0037749 A1* | 2/2023 | Kadam ................. G16H 50/20 |

OTHER PUBLICATIONS

International Search Report and Written Opinion for International Application No. PCT/US2022/030247, dated Sep. 6, 2022, 17 pages.

* cited by examiner

USER SELF-PERSONALIZED TEXT-TO-SPEECH VOICE GENERATION

BACKGROUND

Audio-based content items have a higher barrier to entry than text-based content items. For example, the lack of recording and editing equipment may prevent users from providing audio-based content items to an online system. The quality of an audio recording may vary greatly based on the equipment used for recording audio clips and the environment in which the audio clip was recorded. Additionally, editing of audio clips is harder than editing text. Unlike text that can be easily modified, if a change is desired in an audio clip, the user may need to re-record the audio clip to avoid introducing artifacts to the audio-based content item.

Another barrier to entry to audio-based content items in an online system is that a large number of people do not feel comfortable with listening to recordings of their voices. A person's voice typically sounds different when the person listens to his or her own voice while the person is talking compared to when the person listens to his or her own voice in a voice recording. For example, a person's voice recording can appear to have a higher pitch compared how the person would perceive his or her own voice. Since the voice recording sounds different than what the person expects for his or her own voice, the person may feel uncomfortable when listening to the voice recording.

SUMMARY

To reduce the barrier to entry for audio-based content items, an online system allows users to generate the audio-based content items using a voice synthesis model generated to mimic the voice of the user. The online system receives, from a client device of a posting user, a script for a voice-based content item. The online system retrieves a voice synthesis model stored in the user profile of the posting user and generates a synthetic audio stream using the retrieved voice synthesis model and based on the received script. The online system presents the generated synthetic audio stream to the posting user and receives instructions for modifying the synthetic audio stream. The online system generates a second audio stream based on the received instructions and composes the voice-based tent item based on the generated second audio stream.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
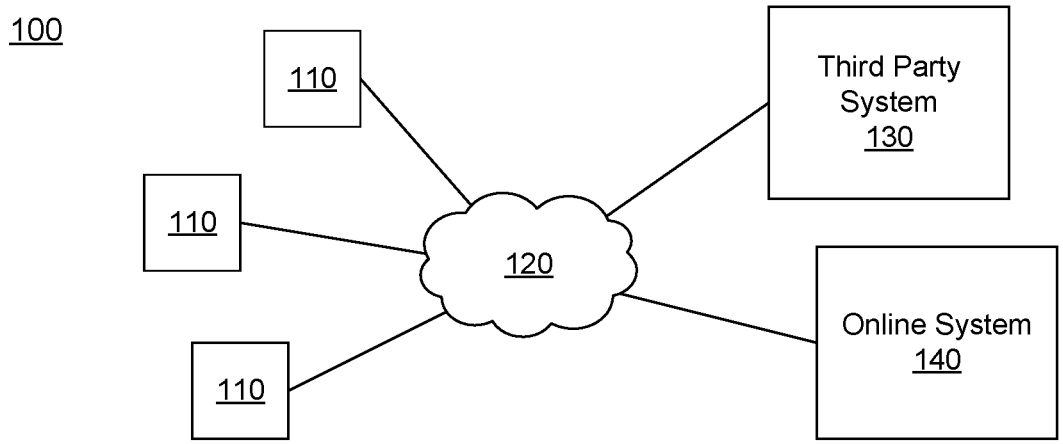
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third-party systems 130 may be coupled to the network 120 for communicating with the online system 140, which is further described below in conjunction with FIG. 2. In one embodiment, a third-party system 130 is an application provider communicating information describing applications for execution by a client device 110 or communicating data to client devices 110 for use by an application executing on the client device. In other embodiments, a third-party system 130 provides content or other information for presentation via a client device 110. A third-party system 130 may also communicate information to the online system 140, such as advertisements, content, or information about an application provided by the third-party system 130.

Figure 2:
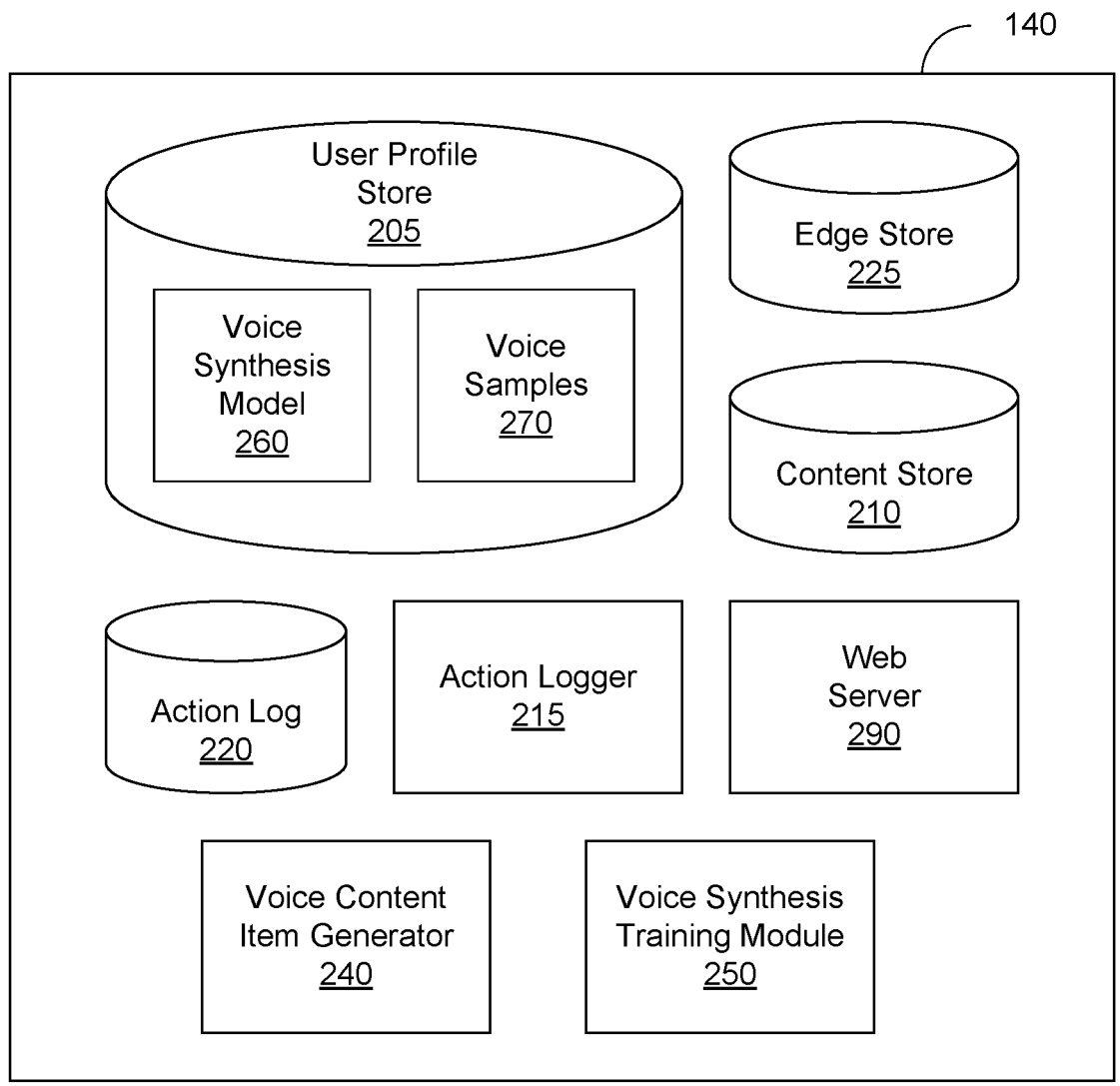
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, the voice content item generator 240, the voice synthesis training module 250, and a web server 290. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

The user profile includes one or more voice synthesis models 260 trained by the voice synthesis training module 250. The voice synthesis models 260 for a user are trained using speech data corresponding to the user. For example, the speech data is gathered by storing recordings of the user's speech, or by extracting audio containing the user's speech from video or audio files provided by the user. In some embodiments, the voice synthesis training module 250 uses a generative adversarial network (GAN) to generate the one or more voice synthesis models 260 for the user. For example, the voice synthesis training module 250 generates a discriminator model that evaluates an audio stream to classify the audio stream as containing the voice of the user. The discriminator model is then used for evaluating the output of the voice synthesis models.

In some embodiments, the voice synthesis models 260 include different voice synthesis models corresponding to various moods. For example, the user profile include a first voice synthesis model corresponding to a happy mood, a second voice synthesis model corresponding to a sad mood, a third voice synthesis model corresponding to a scared mood, a fourth voice synthesis model corresponding to an angry mood, and the like.

In some embodiment, the voice synthesis models 260 include production models and editing models. The production models are used for generating voice-based content items for presentation to other users of the online system. The editing models are used for generating voice-based content items for presentation to the user providing the voice-based content item. The editing models are generated to mimic how the user would perceive his or her own voice, while the production models are generated to mimic how other people would perceive the user's voice. In some embodiment, the editing models are generated based on the production models. For example, the editing models are generated by changing a pitch of the production models.

The user profile may additionally include a set of voice samples 270 for training each of the voice synthesis models. In samples may be provided by the user to the online system. For example, as part of the training process, the online system may prompt the user to record (e.g., using a microphone embedded in a client device) a set of audio clips saying a preset set of phrases. Alternatively, the online system stores voice samples from voice or video calls of the user. The user may provide explicit permission to the online system to store the voice samples to allow the online system to generate the voice synthesis models.

In some embodiments, each voice sample 270 is associated with a mood label. The mood label for each of the voice samples 270 may be provided by the user. That is, when providing the voice sample to the online system, the user may additionally specify a mood corresponding to the voice sample being provided. Alternatively, the mood label may be determined by a trained mood detection model. The online system analyzes the voice samples 270 and determines a score indicative of a likelihood that the voice sample corresponding to a specific mood. The online system can then associate the voice sample with a mood label based on the determined scores.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 include content for presentation to a user and a bid amount. The content is text, image, audio, video, or any other suitable data presented to a user. In various embodiments, the content also specifies a page of content. For example, a content item includes a landing page specifying a network address of a page of content to which a user is directed when the content item is accessed. The bid amount is included in a content item by a user and is used to determine an expected value, such as monetary compensation, provided by an advertiser to the online system 140 if content in the content item is presented to a user, if the content in the content item receives a user interaction when presented, or if any suitable condition is satisfied when content in the content item is presented to a user. For example, the bid amount included in a content item specifies a monetary amount that the online system 140 receives from a user who provided the content item to the online system 140 if content in the content item is displayed. In some embodiments, the expected value to the online system 140 of presenting the content from the content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items may include an objective identifying an interaction that a user associated with a content item desires other users to perform when presented with content included in the content item. Example objectives include installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. Additionally, the online system 140 receives compensation from a user associated with content item as online system users perform interactions with a content item that satisfy the objective included in the content item.

Additionally, a content item may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third-party system 130. For example, targeting criteria identifies users that have taken a particular action, such as sent a message to another user, used an application, joined a group, left a group, joined an event, generated an event description, purchased or reviewed a product or service using an online marketplace, requested information from a third-party system 130, installed an application, or performed any other suitable action. Including actions in targeting criteria allows users to further refine users eligible to be presented with content items. As another example, targeting criteria identifies users having a connection to another user or object or having a particular type of connection to another user or object.

The voice content item generator 240 generates content items to be stored in the content store 210. The voice content item generator 240 generates voice-based content items by generating an audio stream using a voice synthesis model trained by the voice synthesis training module 250. The voice content item generator 240 receives a script for the content item and generates the audio stream based on the received script. The script includes the text to be synthesized into the audio stream, and may additionally include configuration parameters or metadata for instructing the voice synthesis model how to generate the audio stream. For example, the metadata includes a mood for the generated speech or a cadence for the generated speech. In some embodiments, at least a portion of the metadata is used for selecting a voice synthesis model from a set of voice synthesis models corresponding to the user. For example, the ser of voice synthesis models includes different models for a set of moods. Based on the mood metadata included in the script, the voice content item generator 240 selects a voice synthesis model corresponding to the mood metadata from the set of voice synthesis models for the user.

The voice content item generator 240 provides a pre-production graphical user interface (GUI) to allow the user to compose the script for the voice-based content item. The pre-production GUI may include a first field (e.g., a textbox) for providing the text of the script, a second field (e.g., a dropdown menu) for selecting a mood from a list of available moods. In some embodiments, the voice content item generator 240 generates the script and optionally performs pre-processing on the script or the information provided by the user. For example, the voice content item generator 240 normalizes the text and transforms the text into a series of phonemes to be used for generating the audio stream. Moreover, the voice content item generator may determine where to introduce pauses or may determine a set of inflections for the phonemes to be used for generating the audio stream.

The voice content item generator 240 provides a post-production GUI to allow the user to modify the audio stream generated by the voice synthesis module or the voice-based content item generated by the voice content item generator 240. In some embodiments, the post-production GUI presents the generated audio stream to the user and provides tools for indicating how to modify the audio stream. For example, the post-production GUI allows the user to indicate which words were incorrectly synthesized. Based on the input from the user, the voice synthesis model may re-synthesize the audio stream. Moreover, the post-production GUI may provide tools to allow the user to add other sounds to the audio stream. For example, the tools allow the user to add background music or sound effects to the audio stream generated by the voice synthesis model.

Based on the generated audio stream, the voice content item generator 240 generates a new content item. The content item may include a title, an indication of the user associated with the content item, and the generated audio stream. The content item may further include a transcript of the audio stream. The content item is the stored in the content store 210 and is provided to other users of the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third-party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third-party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third-party system 130, including webpage viewing histories, advertisements that were engaged, purchases made, and other patterns from shopping and buying. Additionally, actions a user performs via an application associated with a third-party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Edges may connect two users who are connections in a social network, or may connect a user with an object in the system. In one embodiment, the nodes and edges form a complex social network of connections indicating how users are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The web server 290 links the online system 140 via the network 120 to the one or more client devices 110, as well as to the one or more third-party systems 130. The web server 290 serves web pages, as well as other content, such as JAVA®, FLASH®, XML and so forth. The web server 290 may receive and route messages between the online system 140 and the client device 110, for example, instant messages, queued messages (e.g., email), text messages, short message service (SMS) messages, or messages sent using any other suitable messaging technique. A user may send a request to the web server 290 to upload information (e.g., images or videos) that are stored in the content store 210. Additionally, the web server 290 may provide application programming interface (API) functionality to send data directly to native client device operating systems, such as IOS®, ANDROID™, or BlackberryOS.

Voice-Based Content Item Generation

Figure 3:
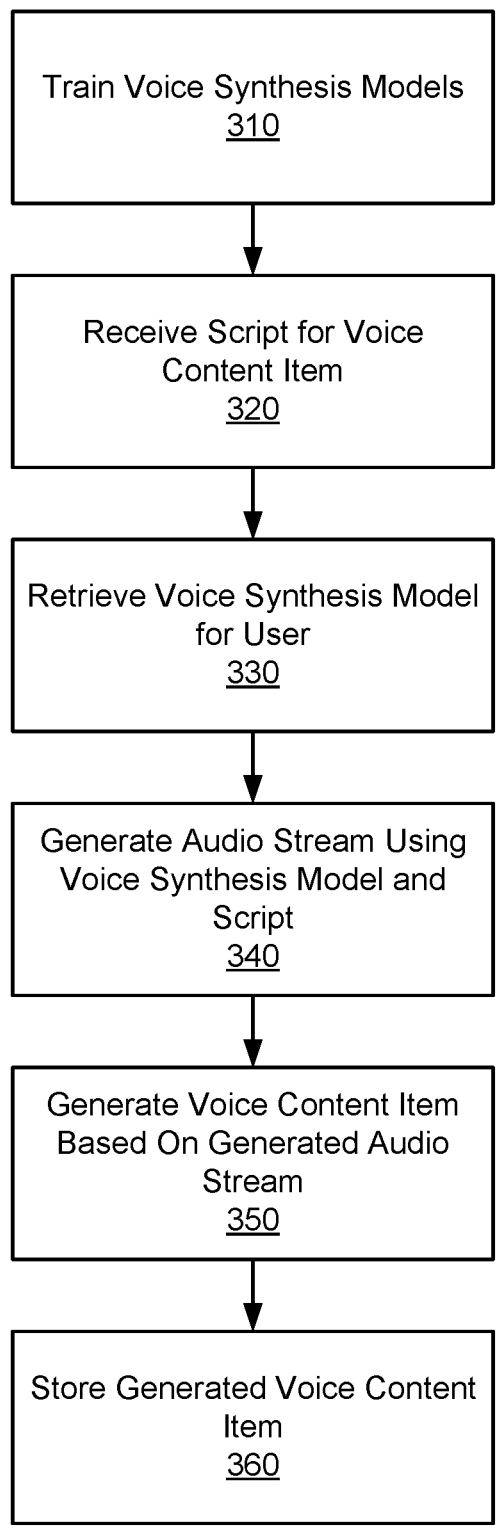
FIG. 3 illustrates a flow diagram of a process for generating a content item for audio based social networking system, according to one embodiment.

FIG. 3 illustrates a flow diagram of a process for generating a content item for audio based social networking system, according to one embodiment. The online system 140 (e.g., a social networking system) trains 310 one or more voice synthesis models for a user of the online system. The voice synthesis models are stored in conjunction with the user profile for the user. Moreover, the voice synthesis models are trained to generate audio files that mimic the voice of the user. Each of the voice synthesis models may mimic the voice of the user in a different mood. For example, a first voice synthesis model mimics the voice of the user in a happy mood, a second voice synthesis model mimics the voice of the user in a sad mood, and a third voice synthesis model mimics the voice of the user in an angry mood.

The voice content item generator 240 receives 320 a script for a new voice-based content item. The scripts may be generated based on a text provided by the user through a graphical user interface provided by the online system 140. The script may also include an indication of a mood for the new voice-based content item. In some embodiments, the script includes additional parameters such as a cadence or speed, the location and duration of one or more pauses, etc. In some embodiments, the voice content item generator 240 or another component of the online system 140 generates the script for the new voice-based content item based on information provided by the user through the graphical user interface provided by the online system 140.

The voice content item generator 240 retrieves 330 a voice synthesis model for the user. The voice synthesis model may be retrieved from the user profile of the user. In some embodiments, a voice synthesis model is selected from a set of voice synthesis models associated with the user based on one or more parameters included in the script. For example, a voice synthesis model is selected based on a mood specified in the script. In some embodiments, if a voice synthesis model is not available for a specific mood, a default voice synthesis model for the user is selected. Additionally, if a user does not have any voice synthesis models associated with the user's profile, a generic voice synthesis model may be use. For example, the voice content item generator 240 allows the user to select a generic voice synthesis model from a set of available generic voice synthesis models.

Using the retrieved voice synthesis model, the voice content item generator 240 generates an audio stream. In particular, the voice content item generator 240 provides the script to the voice synthesis model and causes the voice synthesis model to generate the audio stream based on the contents of the script. In some embodiments, the voice content item generator 240 performs pre-production steps on the script prior to providing the script to the voice synthesis model. For example. The voice content item generator 240 converts a text included in the script to a stream of phonemes. The voice synthesis model then generates the audio stream by synthesizing the stream of phonemes in the voice of the user.

In some embodiments, the stream of phonemes is generated using a trained translation model. The trained translation model may be trained using the voice samples for the user and optionally a transcript for the voice samples. The trained translation model may generate the stream of phonemes that is specific to how the user pronounces each of the words in a script.

In some embodiments, the generated audio stream is presented to the user to allow the user to edit the audio stream. For example, the user may indicate locations of the audio stream that were not synthesized properly (e.g., a location containing a word that was pronounced incorrectly). The user may additionally provide instruction on how to fix the audio stream or what to change in the synthesis of the audio stream. Based on the instructions received from the user, the voice synthesis model re-synthesizes the audio stream.

In some embodiments, the voice content item generator 240 performs post-production steps on the generated audio stream. For example, the online system 140 allows the user to change the intonation or pronunciation of one or more words of phrases in the generated audio stream, add or remove pauses in the generated audio stream, or change the cadence of one or more segments of the generated audio stream. Additionally, the online system 140 allows the user to add background sounds (such as a background music) or sound effects to the generated audio stream.

Once the user has approved the audio stream, the voice content item generator 240 generates 350 the new voice-based content item and stores 360 the new content item in the content store 210. For instance, the voice content item generator 240 composes the new content item having a title, an image, the generated audio stream, and a transcript of the audio stream. In some embodiments, the online system 140 provides a graphical user interface to the user to allow the user to compose the new content item.

The stored content item is presented to other users of the online system 140. In some embodiments, the online system 140 allows users to interact with the content item (e.g., provide comments to the content item or provide a reaction to the content item). In some embodiments, viewing users may provide text-based comments or replies to the audio-based content item. The online system may allow the viewing user that provided the text-based comment or reply or the user that provided the audio-based content item to generate an audio-based comment or reply based on the text-bases comment or reply and a voice synthesis model of the viewing user.

Figure 4A:
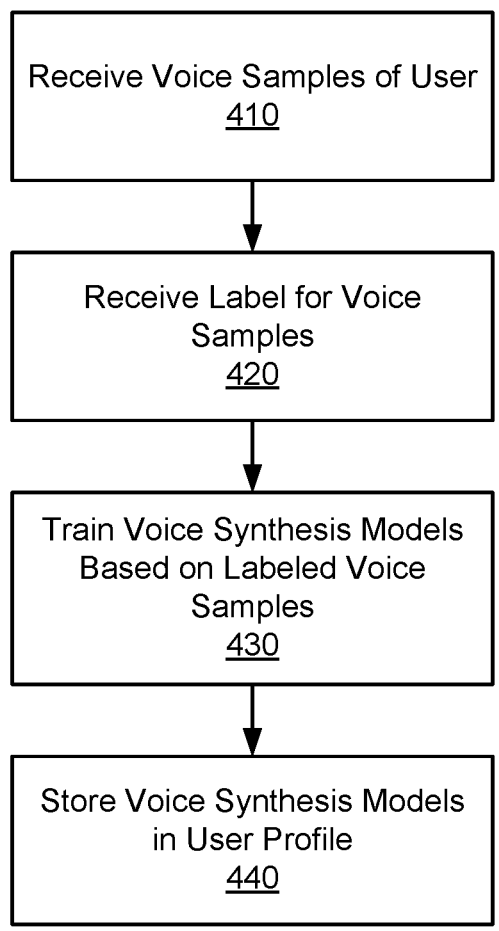
FIG. 4A illustrates a flow diagram of a process for generating a voice synthesis model, according to one embodiment.

FIG. 4A illustrates a flow diagram of a process for generating a voice synthesis model, according to one embodiment. The voice synthesis training module 250 receives 410 a set of voice samples of a user. Each voice sample in the set of voice samples includes a sound recording of the user's speech. In some embodiments the voice synthesis training module 250 further receives 420 labels for each of the voice samples in the received set of voice samples. For example, the labels for each of the voice samples include an indication of a mood of the user corresponding to the user's speech included in the voice sample. In some embodiments, the labels are provided by the user that provided the voice samples. Alternatively, the voice synthesis training module 250 applies a mood identification model for identifying a mood for the speech included in the voice sample and labels the voice sample accordingly. The mood identification model for identifying a mood is trained using voice samples corresponding to other users of the online system.

Based on the set of voice samples, the voice synthesis training module 250 trains 430 one or more voice synthesis models 260. In some embodiments, the voice synthesis training module 250 trains a different voice synthesis model for each mood of a set of moods. In some embodiments, the voice synthesis training module 250 uses a generative adversarial network (GAN) to generate each of the voice synthesis models. The GAN uses a discriminator model that determines whether an audio stream corresponds to a voice recording of the user or a synthesized audio stream generated by the voice synthesis model. In some embodiments, the voice synthesis training module 250 generates one or more discriminator model for each user. Alternatively, the voice synthesis training module 250 uses a global discriminator model that is trained using voice samples and synthetic audio streams of multiple users.

Figure 4B:
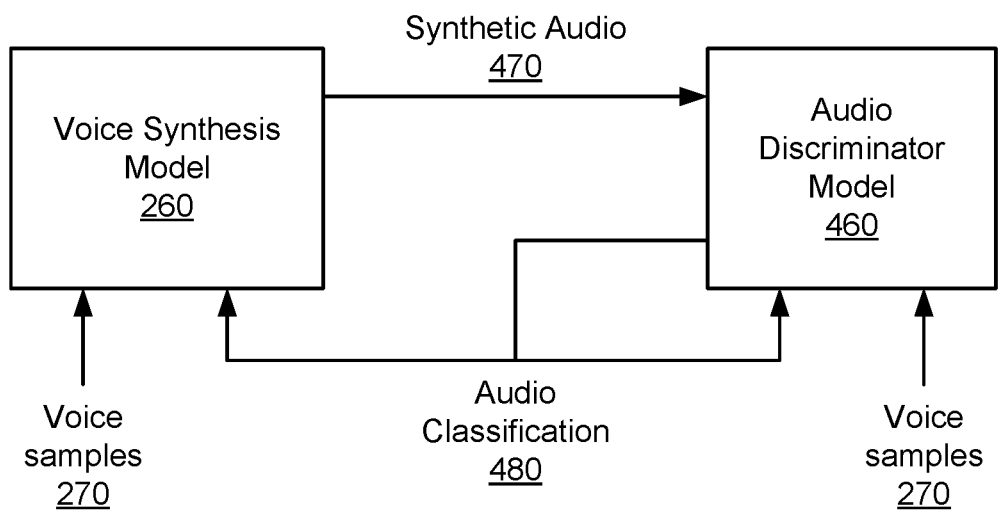
FIG. 4B illustrates a block diagram of the generation of a voice synthesis model, in accordance with one or more embodiments.

FIG. 4B illustrates a block diagram of the generation of a voice synthesis model, in accordance with one or more embodiment. The voice synthesis training module 250 uses an iterative process for refining the voice synthesis model 260 and the discriminator model 460. That is, the voice synthesis training module 250 uses the voice synthesis model 260 to generate a set of test audio stream 470 and provides the set of test audio stream to the discriminator model 460. For each test audio stream 470 in the set of test audio streams, the discriminator model 460 determines an audio classification 480 indicating a prediction of whether the test audio stream is a synthesized audio stream or a voice recording. Based on the audio classification 480 determined by the discriminator model, the voice synthesis training module 250 modifies the voice synthesis model 260 and the discriminator model 460.

The online system 140 stores 440 the trained voice synthesis models 260 in the user profile of the user. In some embodiments, the online system 140 allows the user to adjust the voice synthesis model after the voice synthesis training module 250 has completed the training process. For example, the online allows the user to change the cadence, pitch, or intonation of the audio generated by the voice synthesis models. Moreover, in some embodiments, the online system 140 stores the discriminator model 460 in the user profile of the user.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    receiving, from a client device of a posting user of an online system, a script for a voice-based content item;
    retrieving a voice synthesis model stored in a user profile of the posting user, the voice synthesis model trained at least based on a plurality of voice samples of the posting user, wherein the script comprises an indication of a mood for the voice-based content item, and wherein retrieving the voice synthesis model comprises selecting the voice synthesis model from a plurality of candidate voice synthesis models stored in the user profile of the posting user, each different candidate voice synthesis models trained using training data corresponding to a different mood, the selection of the voice synthesis model selected from the plurality of candidate voice synthesis models based on the indication of the mood for the voice-based content item matching a mood with which the voice synthesis model's training data was labeled;
    generating a synthetic audio stream using the retrieved voice synthesis model and based on the received script;
    presenting the generated synthetic audio stream to the posting user;
    receiving instructions for modifying the synthetic audio stream;
    generating a second audio stream based on the received instructions;
    composing the voice-based content item based on the generated second audio stream; and
    presenting the voice-based content item to a viewing user of the online system.

2. The method of claim 1, wherein generating the second audio stream comprises:
retrieving a second voice synthesis model stored in the user profile of the posting user; and
generating the second audio stream using the retrieved second voice synthesis model and based on the received script and the received instructions for modifying the synthetic audio.

3. The method of claim 1, further comprising:
receiving the plurality of voice samples of the posting user;
generating the voice synthesis model using the plurality of voice samples of the posting user;
generating a discriminator model using the plurality of voice samples of the posting user, the discriminator model for determining whether an audio stream includes a voice recording of the posting user;
generating a test audio stream using the voice synthesis model;
determining a classification for the test audio stream using the discriminator model; and
refining the voice synthesis model and the discriminator model based on the determined classification for the test audio stream.

4. The method of claim 3, further comprising:
storing the voice synthesis model in the user profile of the posting user.

5. The method of claim 1, wherein the instructions for modifying the synthetic audio stream includes at least one of instructions for changing an intonation or pronunciation of one or more words or phrases in the generated synthetic audio stream, adding a pause in the generated audio stream, removing a pause in the generated synthetic audio stream, changing a cadence of at least a portion of the generated synthetic audio stream, and adding sound effects to the generated synthetic audio stream.

6. The method of claim 1, further comprising:
generating a stream of phonemes based on the received script,
wherein the synthetic audio stream is generated by using the retrieved voice synthesis model based on the generated stream of phonemes.

7. The method of claim 6, further comprising:
presenting the stream of phonemes to the posting user; and
receiving, from the client device of the posting user, a modified stream of phonemes,
wherein the synthetic audio stream is generated by using the retrieved voice synthesis model based on the received modified stream of phonemes.

8. A non-transitory computer-readable storage medium configured to store instructions, the instructions when executed by a processor cause the processor to:
receive, from a client device of a posting user of an online system, a script for a voice-based content item;
retrieve a voice synthesis model stored in a user profile of the posting user, the voice synthesis model trained at least based on a plurality of voice samples of the posting user, wherein the script comprises an indication of a mood for the voice-based content item, and wherein retrieving the voice synthesis model comprises selecting the voice synthesis model from a plurality of candidate voice synthesis models stored in the user profile of the posting user, each different candidate voice synthesis models trained using training data corresponding to a different mood, the selection of the voice synthesis model selected from the plurality of candidate voice synthesis models based on the indication of the mood for the voice-based content item matching a mood with which the voice synthesis model's training data was labeled;
generate a synthetic audio stream using the retrieved voice synthesis model and based on the received script;
present the generated synthetic audio stream to the posting user;
receive instructions for modifying the synthetic audio stream;
generate a second audio stream based on the received instructions;
compose the voice-based content item based on the generated second audio stream; and
present the voice-based content item to a viewing user of the online system.

9. The non-transitory computer-readable storage medium of claim 8, wherein the instructions for generating the second audio stream cause the processor to:
retrieve a second voice synthesis model stored in the user profile of the posting user; and
generate the second audio stream using the retrieved second voice synthesis model and based on the received script and the received instructions for modifying the synthetic audio.

10. The non-transitory computer-readable storage medium of claim 8, wherein the instructions further cause the processor to:
receive the plurality of voice samples of the posting user;
generate the voice synthesis model using the plurality of voice samples of the posting user;
generate a discriminator model using the plurality of voice samples of the posting user, the discriminator model for determining whether an audio stream includes a voice recording of the posting user;
generate a test audio stream using the voice synthesis model;
determine a classification for the test audio stream using the discriminator model; and
refine the voice synthesis model and the discriminator model based on the determined classification for the test audio stream.

11. The non-transitory computer-readable storage medium of claim 10, wherein the instructions further cause the processor to:
store the voice synthesis model in the user profile of the posting user.

12. The non-transitory computer-readable storage medium of claim 8, wherein the instructions for modifying the synthetic audio stream includes at least one of instructions for changing an intonation or pronunciation of one or more words or phrases in the generated synthetic audio stream, adding a pause in the generated audio stream, removing a pause in the generated synthetic audio stream, changing a cadence of at least a portion of the generated synthetic audio stream, and adding sound effects to the generated synthetic audio stream.

13. The non-transitory computer-readable storage medium of claim 8, wherein the instructions further cause the processor to:
generate a stream of phonemes based on the received script,
wherein the synthetic audio stream is generated by using the retrieved voice synthesis model based on the generated stream of phonemes.

14. The non-transitory computer-readable storage medium of claim 13, wherein the instructions further cause the processor to:
present the stream of phonemes to the posting user; and
receive, from the client device of the posting user, a modified stream of phonemes,
wherein the synthetic audio stream is generated by using the retrieved voice synthesis model based on the received modified stream of phonemes.

15. A system comprising:
a user profile store configured to store a user profile for each user of an online system, each user profile comprising a set of voice synthesis model trained at least based on a plurality of voice samples of the user; and
a voice-based content item generator configured to:
receive, from a client device of a posting user of an online system, a script for a voice-based content item;
retrieve a voice synthesis model stored in the user profile of the posting user, wherein the script comprises an indication of a mood for the voice-based content item, and wherein retrieving the voice synthesis model comprises selecting the voice synthesis model from a plurality of candidate voice synthesis models stored in the user profile of the posting user, each different candidate voice synthesis models trained using training data corresponding to a different mood, the selection of the voice synthesis model selected from plurality set of candidate voice synthesis models based on the indication of the mood for the voice-based content item matching a mood with which the voice synthesis model's training data was labeled;
generate a synthetic audio stream using the retrieved voice synthesis model and based on the received script;
present the generated synthetic audio stream to the posting user;
receive instructions for modifying the synthetic audio stream;
generate a second audio stream based on the received instructions; and
compose the voice-based content item based on the generated second audio stream.

16. The system of claim 15, further comprising:
a voice synthesis training module configured to:
receive the plurality of voice samples of the posting user;
generate the voice synthesis model using the plurality of voice samples of the posting user;
generate a discriminator model using the plurality of voice samples of the posting user, the discriminator model for determining whether an audio stream includes a voice recording of the posting user;
generate a test audio stream using the voice synthesis model;
determine a classification for the test audio stream using the discriminator model; and
refine the voice synthesis model and the discriminator model based on the determined classification for the test audio stream.

17. The system of claim 15, wherein the voice-based content item generator is further configured to:
generate a stream of phonemes based on the received script;
present the stream of phonemes to the posting user; and
receive, from the client device of the posting user, a modified stream of phonemes,
wherein the synthetic audio stream is generated by using the retrieved voice synthesis model based on the received modified stream of phonemes.

\* \* \* \* \*